GROWTH LAYER OF SEMICONDUCTOR COMPOUNDS
PRODUCED BY MELT EPITAXY
Filed Feb. 10, 1970

United States Patent Office 3,705,825
Patented Dec. 12, 1972

3,705,825

GROWTH LAYER OF SEMICONDUCTOR COMPOUNDS PRODUCED BY MELT EPITAXY

Wolfgang Touchy and Eckart Bungenstab, Munich, Germany, assignors to Siemens Aktiengesellschaft Filed Feb. 10, 1970, Ser. No. 10,234
Claims priority, application Germany, Feb. 19, 1969, F 19 08 277.0
Int. Cl. H01l 7/34, 7/40
U.S. Cl. 148—1.5 5 Claims

ABSTRACT OF THE DISCLOSURE

Method of producing epitactic growth layers of variable conductance type by use of silicon as the dopant substance with compounds which easily dissociate at the melting point, preferably gallium arsenide, by melt epitaxy. The production of the melt, provided for the growth process, and the growth process per se are effected under vapor pressure of the participating materials in an evacuated reaction vessel.

Figure 1:
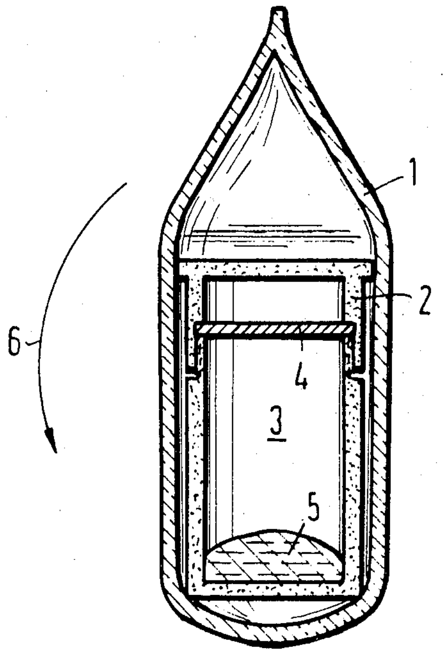

Our invention relates to a method for the production of epitactic growth layers of varying conductance type by use of silicon as a dopant with semiconducting compounds which easily dissociate at the melting point, preferably gallium arsenide, by melt epitaxy.

Specific semiconductor devices of semiconducting compounds, such as gallium arsenide containing luminescence diodes, coupling elements, laser diodes and gallium arsenide transistors, require the use of completely pure gallium arsenide crystals which, above all, is oxygen and heavy metal free.

The magazine "RCA Review" vol. XXIV, December 1963, pages 603 to 606, disclose a melt epitaxy method for gallium arsenide by Nelson, wherein a gallium arsenide substrate, located in a diagonally positioned quartz tube is contacted with a melt of gallium arsenide provided with a tin addition as a dopant. The growth of the gallium arsenide layer provided with the tin doping is carried out in a flowing hydrogen atmosphere.

For certain uses, it is necessary to install silicon as the dopant substance in place of the tin. It is of particular importance in this respect that the ambient atmosphere to a large extent be eliminated during the epitactic growth process, since the ambient atmosphere would influence the silicon doping in an uncontrollable mannner.

The object of the present invention is:

(a) to produce reproducible, coated growth layers of gallium arsenide, and
(b) to use silicon as the dopant substance, whereby the effect of the amphoteric behavior of the silicon which is used as a dopant can be utilized for gallium arsenide crystals (transition point from n into p conductivity is at 920° C.).

To achieve these results the melt provided for the growth process as well as the growth process itself is effected under vapor pressure of the participating materials, in an evacuated reaction vessel.

A further development of the inventive idea is to use an evacuated quartz ampule in which is installed a carbon or quartz capsule, which contains the melt and the substrate provided for epitactic precipitation and is sealed with a screw. The operation is preferably conducted at a pressure of 1 to $5 \cdot 10^{-6}$ torr.

A particularly preferred embodiment example for obtaining epitactic growth layers of gallium arsenide having variable conductance type and employing silicon as the dopant is to produce a gallium/gallium arsenide melt with a silicon content of 1 to 2%, saturated with gallium arsenide and heated to 970° C. A gallium arsenide substrate of n-conductance type is embedded into the cover of the carbon or quartz capsule and the melt is tilted upon the substrate through rotation of the capsule 180°. Upon cooling the substrate provided with the melt, a transition to p-conductance type is brought about in the grown layer and finally the capsule is returned to its original position, at an approximate temperature of 500° C.

The present invention affords the opportunity to repeat the tilting process in order to produce a sequence of growth layers with alternately varying conductance types. This can be repeated as often as desired.

The epitactic growth layers produced according to the method of the invention, are characterized by a particularly good reproducibility and are very well suited for the production of semiconductor bodies which are to be processed into semiconductor device components, particularly of gallium arsenide crystals, such as gallium arsenide luminescence diodes.

Figure 2:
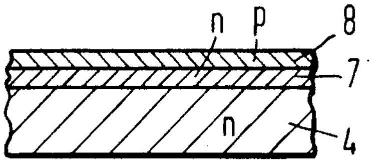

FIGS. 1 and 2 and the following example give a clear illustration of the method according to the present invention, wherein:

FIG. 1 shows a quartz ampule, evacuated up to a pressure of 1 to $5 \cdot 10^{-6}$ torr, housing a carbon capsule 3, provided with a screwable lid 2. The lid 2 contains the substrate wafer 4 (original thickness about 200 micron) which is embedded in the lid and which comprises n-coated gallium arsenide and is provided for the epitactic precipitation. The substrate wafer 4 is opposite the melt 5 situated at the bottom of the capsule 3. The melt 5 comprises a gallium melt, saturated with gallium arsenide and having a dopant content of 1 to 2% silicon. This melt is heated to 970° C. and is flipped over upon the substrate wafer 4, through a rotation of the entire arrangement (1, 3) by 180° as indicated by arrow 6. While the substrate, which was brought into contact with the melt is being cooled, the amphoteric behavior of the silicon produces at a temperature of 920° C., a transition from n to p conductance in the epitactically grown layer so that, after the device, arrangement 1, 3) has been returned to its original position at approximately 500° C., an n-doped epitatic layer of 30 micron thickness as well as a p-doped layer of the same thickness will have formed on the original substrate 4.

The layer sequence can be seen in FIG. 2. The substrate is given reference numeral 4 and the grown n-coated layer 7 and the p-coated layer 8.

By again heating the melt to a temperature of more than 920° C., another melting of material affords the precipitation of another n-doped layer which, if necessary, can be converted to a p-doped region, following the cooling process.

We claim:

1. A method of producing epitactic growth layers of varying conductance type producing compounds, which easily dissociate at the melting point, by melt epitaxy using silicon as the dopant, which comprises preparing a melt of semiconductor compound with a silicon content of 1 to 2%, placing a semiconductor substrate and said melt in a reaction vessel, evacuating the reaction vessel to the vapor pressure which prevails at the melting point of said semiconductor compound, rotating the reaction vessel 180° C. thereby flipping the melt upon the surface of the substrate wafer, cooling the substrate with the melt thus producing an epitactic layer on said substrate and rotating said reaction vessel 180° to its original position.

2. The method of claim 1, wherein gallium arsenide is the epitactic material therefor and is introduced into an evacuated quartz ampule, in which is inserted a capsule of carbon or quartz and a screwable closing, said capsule contains the melt and the substrate provided for the epitactic precipitation.

3. The method of claim 2, wherein the operations are carried out at a pressure of 1 to $5\cdot 10^{-6}$ torr.

4. A method of producing epitactic gallium arsenide layers of varying conductance type with silicon as a dopant which comprises preparing a gallium/gallium arsenide alloy with a silicon content of 1 to 2%, and saturated with gallium arsenide and placing a gallium arsenide substrate in the cover of the carbon or quartz capsule of n-type conductance, melting the alloy by heating to 970° C., rotating the capsule 180°, thereby flipping the melt over upon the substrate, cooling the substrate with the melt, thus producing a p-type conductance layer on the substrate grown layer and at a temperature of approximately 500° C., rotating the capsule 180° to its original position.

5. The method of claim 4, which comprises repeating the rotating process at least once to produce a layer sequence of growth layers, with alternately differing conductance.

References Cited

UNITED STATES PATENTS

| | | | |
|---|---|---|---|
| 3,158,512 | 11/1964 | Nelson et al. | 148—1.5 |
| 3,322,501 | 5/1967 | Woodall | 252—62.36 A |
| 3,463,680 | 8/1969 | Melngailis et al. | 252—62.36 A |
| 3,533,856 | 10/1970 | Panish et al. | 148—171 X |
| 3,535,772 | 10/1970 | Knight et al. | 148—1.5 X |
| 3,551,116 | 12/1970 | Woodall et al. | 252—62.36 AX |

ALLEN B. CURTIS, Primary Examiner

U.S. Cl. X.R.

148—171; 252—62.36 A